US008575255B2

(12) United States Patent
Yener et al.

(10) Patent No.: US 8,575,255 B2
(45) Date of Patent: Nov. 5, 2013

(54) APPLICATIONS OF SHAPED NANO ALUMINA HYDRATE AS BARRIER PROPERTY ENHANCER IN POLYMERS

(75) Inventors: Doruk Omer Yener, Wilmington, MA (US); Olivier Guiselin, Northboro, MA (US); Ralph Bauer, Niagara Falls (CA)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/253,693

(22) Filed: Oct. 17, 2008

(65) Prior Publication Data
US 2009/0136744 A1  May 28, 2009

Related U.S. Application Data

(60) Provisional application No. 60/981,363, filed on Oct. 19, 2007.

(51) Int. Cl.
*C08K 3/10* (2006.01)

(52) U.S. Cl.
USPC .......................................... 524/437; 428/338

(58) Field of Classification Search
USPC ................... 523/200, 210, 1, 437; 524/437
See application file for complete search history.

(56) References Cited

U.S. PATENT DOCUMENTS

| | | | |
|---|---|---|---|
| 2,763,620 A | 9/1956 | Bugosh | |
| 2,915,475 A | 12/1959 | Bugosh | |
| 3,056,747 A | 10/1962 | Arthur, Jr. | |
| 3,117,944 A | 1/1964 | Harrell | |
| 3,136,644 A | 6/1964 | Pangonis | |
| 3,202,626 A | 8/1965 | FitzSimmons | |
| 3,357,791 A | 12/1967 | Napier | |
| 3,385,663 A | 5/1968 | Hughes | |
| 3,387,447 A | 6/1968 | Trammell et al. | |
| 3,790,495 A | 2/1974 | Podschus | |
| 3,865,599 A | 2/1975 | Mansmann et al. | |
| 4,117,105 A | 9/1978 | Hertzenberg et al. | |
| 4,120,943 A | 10/1978 | Iwaisako et al. | |
| 4,344,928 A | 8/1982 | Dupin et al. | |
| 4,492,682 A | 1/1985 | Trebillon | |
| 4,797,139 A | 1/1989 | Bauer | |
| 4,946,666 A | 8/1990 | Brown | |
| 4,992,199 A | 2/1991 | Meyer et al. | |
| 5,155,085 A * | 10/1992 | Hamano et al. | 502/303 |
| 5,194,243 A | 3/1993 | Pearson et al. | |
| 5,306,680 A | 4/1994 | Fukuda | |
| 5,332,777 A | 7/1994 | Goetz et al. | |
| 5,401,703 A | 3/1995 | Fukuda | |
| 5,413,985 A | 5/1995 | Thome et al. | |
| 5,550,180 A | 8/1996 | Elsik et al. | |
| 5,707,716 A | 1/1998 | Yoshino et al. | |
| 5,849,827 A | 12/1998 | Boediger et al. | |
| 5,900,449 A | 5/1999 | Custodero et al. | |
| 5,989,515 A | 11/1999 | Watanabe et al. | |
| 6,143,816 A | 11/2000 | Prescher et al. | |
| 6,203,695 B1 | 3/2001 | Harle et al. | |
| 6,261,674 B1 * | 7/2001 | Branham et al. | 428/218 |
| 6,403,007 B1 | 6/2002 | Kido et al. | |
| 6,413,308 B1 | 7/2002 | Xu et al. | |
| 6,440,187 B1 | 8/2002 | Kasai et al. | |
| 6,440,552 B1 | 8/2002 | Kajihara et al. | |
| 6,485,656 B1 | 11/2002 | Meyer et al. | |
| 6,576,324 B2 | 6/2003 | Yoshino et al. | |
| 6,610,261 B1 | 8/2003 | Custodero et al. | |
| 6,689,432 B2 | 2/2004 | Kitamura et al. | |
| 6,706,660 B2 | 3/2004 | Park | |
| 7,056,585 B2 | 6/2006 | Mishima et al. | |
| 7,189,775 B2 | 3/2007 | Tang et al. | |
| 7,531,161 B2 | 5/2009 | Tang et al. | |
| 2002/0004549 A1 | 1/2002 | Custodero et al. | |
| 2002/0106523 A1 * | 8/2002 | Urabe et al. | 428/474.4 |
| 2002/0127385 A1 * | 9/2002 | Topolkaraev et al. | 428/315.5 |
| 2002/0132960 A1 * | 9/2002 | Haile et al. | 528/272 |
| 2003/0031851 A1 * | 2/2003 | Bourdelais et al. | 428/221 |
| 2003/0078333 A1 * | 4/2003 | Kawaguchi et al. | 524/447 |
| 2003/0197300 A1 | 10/2003 | Tang et al. | |
| 2003/0202923 A1 | 10/2003 | Custodero et al. | |
| 2004/0166324 A1 | 8/2004 | Mishima et al. | |
| 2005/0028806 A1 * | 2/2005 | Kumamoto et al. | 126/263.02 |
| 2005/0124745 A1 * | 6/2005 | Bauer et al. | 524/437 |
| 2005/0228073 A1 * | 10/2005 | Nishio et al. | 523/200 |
| 2006/0223930 A1 * | 10/2006 | Matsumoto et al. | 524/437 |
| 2006/0286294 A1 | 12/2006 | Fish et al. | |

(Continued)

FOREIGN PATENT DOCUMENTS

| | | |
|---|---|---|
| DE | 199 31 204 | 1/2001 |
| EP | 0015196 | 4/1982 |

(Continued)

OTHER PUBLICATIONS

Brunauer, Stephen; Emmet, P.H.; Teller, Edward, "Adsorption of Gases in Multimolecular Layers," J. Am. Chem. Soc., 1938, 60 (2), pp. 309.

Sridhar Komarneni, "Nanocomposites", J. Mater. Chem., 1992, 2(12), 1219-1230.

S. Furuta et al., "Preparation and properties of fibrous boehmite sol and its application for thin porous membrane", Journal of Materials Science Letters 13 (1994) 1077-1080.

B.S. Gevert and Zhong-Shu Ying, "Formation of fibrillar boehmite", Journal of Porous Materials, 6, 63-67 (1999).

M.P.B. Van Bruggen, "Preparation and properties of colloidal core-shell rods with adjustable aspect ratios", Langmuir 1998, 14, 2245-2255.

(Continued)

*Primary Examiner* — Peter F Godenschwager
(74) *Attorney, Agent, or Firm* — Mike W. Crosby; Abel Law Group, LLP

(57) ABSTRACT

A polymer composition having enhanced barrier properties includes a polymer base and alumina particulates dispersed within the polymer base. The alumina particulates have a secondary aspect ratio at least about 3:1. The polymer composition has an Oxygen Transfer Index of at least about 150.

18 Claims, 2 Drawing Sheets

(56) References Cited

U.S. PATENT DOCUMENTS

| | | | |
|---|---|---|---|
| 2007/0026170 A1* | 2/2007 | Kawano et al. | 428/32.34 |
| 2007/0104952 A1* | 5/2007 | Bianchi et al. | 428/403 |
| 2007/0116641 A1* | 5/2007 | Takemura | 423/626 |
| 2007/0129698 A1* | 6/2007 | Vukos et al. | 604/378 |
| 2007/0190279 A1* | 8/2007 | Mussig et al. | 428/40.1 |
| 2007/0194289 A1* | 8/2007 | Anglin et al. | 252/601 |

FOREIGN PATENT DOCUMENTS

| | | |
|---|---|---|
| EP | 0304721 A1 | 3/1989 |
| EP | 0563653 A1 | 10/1993 |
| EP | 0736392 A1 | 10/1996 |
| EP | 0896021 A1 | 2/1999 |
| EP | 1225200 A2 | 7/2002 |
| EP | 1256599 A1 | 11/2002 |
| EP | 1323775 A1 | 7/2003 |
| EP | 1580223 A | 9/2005 |
| EP | 1 499 666 B1 | 9/2009 |
| GB | 1022944 | 3/1966 |
| JP | 59193949 | 11/1984 |
| JP | 60-046923 | 3/1985 |
| JP | 05279019 | 10/1993 |
| JP | 6322243 | 11/1994 |
| JP | 2000239014 | 9/2000 |
| JP | 2001180930 | 7/2001 |
| JP | 20010207077 | 7/2001 |
| JP | 2001261976 | 9/2001 |
| JP | 2003-002642 A | 1/2003 |
| JP | 2003002642 A | 1/2003 |
| JP | 2003054941 | 2/2003 |
| JP | 2003238150 | 8/2003 |
| JP | 2005-248000 | 9/2005 |
| SU | 267064 A | 7/1970 |
| WO | 9511270 | 4/1995 |
| WO | 9723566 | 7/1997 |
| WO | 03089508 A | 10/2003 |
| WO | 2005100244 A2 | 10/2005 |
| WO | 2005100491 A2 | 10/2005 |
| WO | 2006049863 A | 5/2006 |
| WO | 2008070515 A | 6/2008 |
| WO | 2008070520 A | 6/2008 |
| WO | 2008079710 A | 7/2008 |

OTHER PUBLICATIONS

John Bugosh, "Colloidal alumina—the chemistry and morphology of colloidal boehmite", J. Phys. Chem., 1961, 65 (10), pp. 1789-1793.

Paul A. Buining et al., "Effect of hydrothermal conditions on the morphology of colloidal boehmite particles: Implications for fibril formation and monodispersity", J. Am. Ceram. Soc., 1990, 73[8] 2385-90.

Tijburg, I., et al., "Sintering of Pseudo-Boehmite and Gamma-A12O3," Journal of Materials Science, vol. 26, No. 21, pp. 5945-5949, 1991. Abstract Only.

L.A. Blank et al., "Modification of fillers for Ftorlon-4 with microfibrous boehmite", Sov. Plast., 1972, 2, 66-67.

Paul A. Buining et al., "Preparation on (non-)aqueous dispersions of colloidal boehmite needles", Chemical Engineering Science, 48(2), 411-417, 1993.

Johann Buitenhuis et al., "Phase separation of mixtures of colloidal boehmite rods and flexible polymer," Journal of Colloid and Interface Science, 1995, 175, 46-56.

Thomas J. Martin, Sasol Presentation given on—Functionalized Aluminas, NABALTECH, web page: http://www.nabaltec.de/seiten_d/boehmit_d/anwendungen/news_05_08_98.htm.

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based on Polymer Matrices & Organic Components", NTIS, Germany 1994.

Buining et al., J. Am. Ceram. Soc. vol. 74 [6], pp. 1303-1307.

Anonymous: "High Purity Dispersible Aluminas"; URL:http://www.sasol.com/sasol_internet/downloads/DISPERAL-DISPAL_1055338543391.pdf>abstract; tables 1,2.

Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.

V.G. Fitzsimmons, W.A. Zisman, "Microfiber reinforcement of polytetrafluoroethylene", Modem Plastics, 1963, 40 (5), 151-154, 158, 160-162, 238-241.

John Bugosh et al., "A Novel fine alumina powder, fibrillar boehmite", I&EC Product Research and Development, vol. 1, No. 3, Sep. 1962.

P.A. Buining et al., "Preparation and properties of dispersions of colloidal boehmite rods", Progr Colloid Polym Sci 93:10-11 (1993).

* cited by examiner

APPLICATIONS OF SHAPED NANO ALUMINA HYDRATE AS BARRIER PROPERTY ENHANCER IN POLYMERS

CROSS REFERENCE TO RELATED APPLICATIONS

The present application is a Non-Provisional of U.S. Provisional Patent Application No. 60/981,363, filed Oct. 19, 2007, entitled "APPLICATIONS OF SHAPED NANO ALUMINA HYDRATE AS BARRIER PROPERTY ENHANCER IN POLYMERS", naming inventors Doruk O. Yener, Olivier Guiselin, and Ralph Bauer, which application is incorporated by reference herein in its entirety.

FIELD OF THE DISCLOSURE

This disclosure, in general, relates to applications of shaped nano alumina hydrate as barrier property enhancers in polymers.

BACKGROUND

Industry is increasingly turning to composite materials that include a polymer and fillers. The polymer generally provides desirable mechanical properties and processability over other materials. Traditionally, fillers are used to provide color or reduce cost, but may augment the mechanical properties and processability of the polymer.

Traditional fillers include milled mineral particulate, or carbon products, such as carbon black and graphite. For example, carbon black and mineral fillers are commonly used in the tire industry. Other mineral fillers are common in building materials and food packing. In general, use of inexpensive filler material, such as carbon black and other mineral fillers, reduces costs and imparts an acceptable color to a product.

More recently, industry is seeking to improve properties of polymer products. For example, barrier properties of polymers are relevant to packaging. For example, oxygen and water vapor in contact with food can increase the rate of spoilage, limiting shelf life. Polymers with good barrier properties can effectively reduce the transfer rate of oxygen and water vapor into the packaged product and extend the shelf life of the product. However, traditional polymer having desirable barrier properties are expensive.

Construction is another area where barrier properties are desirable. Water vapor passing through walls can condense inside the wall and lead to wood rot, mold growth, and pealing of paint. Polymers with desirable barrier properties can effectively reduce the transfer of water vapor through the exterior walls, reducing mold growth and maintenance costs.

Barrier properties are also desired by the tire industry to reduce deflation and prevent moisture buildup within tires. In general, the tire industry generally relies on a multilayer structure including additional material layers to reduce loss of pneumatic pressure. A typical tire is a multilayer structure including an outer tread layer, reinforcement, and an inner butyl liner. Forming, such a multilayer structure is process sensitive and improper processing may lead to delamination of the layer. In recent times, delamination of tread has been cited as a contributing factor to vehicular accidents.

More recently, the tire industry has turned to silica and alumina fillers. For example, publications WO 2006/060468 and WO 2004/090023 broadly disclose use of aluminum-based filler in rubber compositions. However, such aluminum-based fillers have yet to penetrate the tire manufacturing industry to the extent that carbon or silica based materials have. In particular, prior art publications have failed to show significant advantages for use of alumina fillers over carbon black or silica.

As such, an improved composite material would be desirable.

SUMMARY

In a particular embodiment, a polymer composition having enhanced barrier properties includes a polymer base and alumina particulates dispersed within the polymer base. The alumina particulates have a secondary aspect ratio at least about 3:1. The polymer composition has an Oxygen Transfer Index of at least about 150.

In another exemplary embodiment, a polymer composition having enhanced barrier properties includes a polymer base and alumina particulates dispersed within the polymer base. The alumina particulates have a secondary aspect ratio at least about 3:1. The polymer composition has a Water Vapor Transfer Index of at least about 120.

In a further exemplary embodiment, a method of producing a polymer product having enhanced barrier properties includes mixing a dried polymer with an amount of dried alumina particulates to form a mixture. The amount of the alumina particulates is between about 0.5 wt % and about 50 wt %, and the alumina particulates have a secondary aspect ratio at least about 3:1. The method further includes extruding the mixture to form an extrudate and forming the polymer product from the extrudate.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
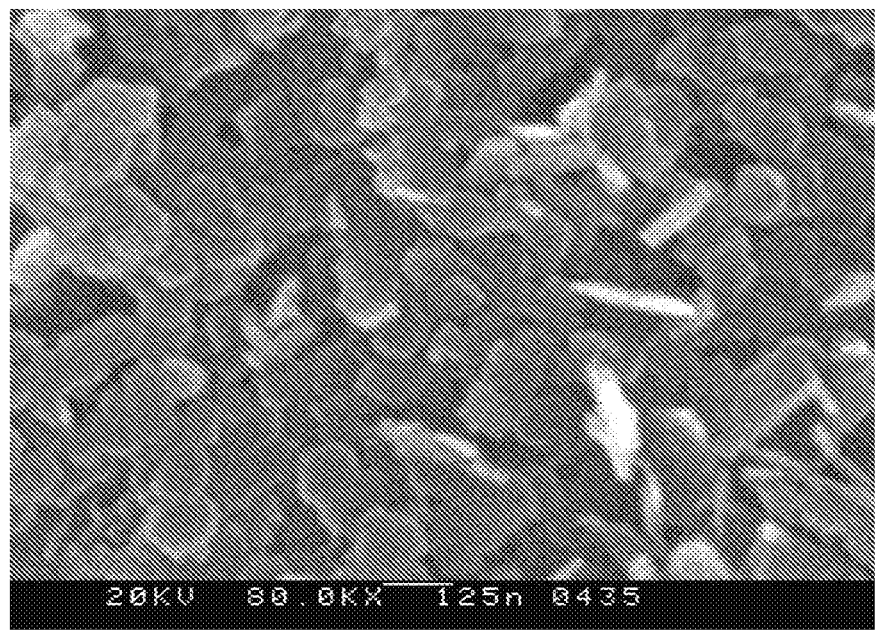
FIG. 1 is an illustrative image of exemplary platelet shaped particles.

In a particular embodiment, a composite material includes a polymer and an anisotropic alumina particulate. The anisotropic alumina particulate may have a secondary aspect ratio of at least about 3:1. In an example, the polymer is a thermoplastic polymer, such as a polyamide. In another example, the polymer is an elastomeric material, such as a diene elastomer. In addition, the composite material may exhibit a resistance to gas and water vapor transport. For example, the composite material may exhibit a desirably low oxygen transfer rate.

In another exemplary embodiment, a composite material is formed by blending dry anisotropic alumina particulate with dry polymer powder and extruding the blend to form a composite material. For example, the composite material may be in the form of a powder, pellets, or spheres. The composite material may be extruded to form an article of manufacture having desirable resistance to oxygen and water transport.

In an exemplary embodiment, the composite material includes a polymer. The polymer may include a thermoset polymer, a thermoplastic polymer, or any combination thereof. An exemplary polymer includes a polyolefin, a halogenated polyolefin, a polyamide, a polyimide, an acrylic polymer, a diene elastomer, a styrene elastomer, a vinyl polymer, a polyester, a polyether, a phenolic resin, or any blend or copolymer thereof, or any combination thereof. An example of a polyamide includes polyamide 6, polyamide 6,6, polyamide 11, polyamide 12, or any blend or copolymer thereof, or any combination thereof. An example of a styrene elastomer includes acrylonitrile butadiene styrene (ABS), poly styrene butadiene (SBR), poly styrene butadiene styrene (SBS), or any blend or copolymer thereof, or any combination thereof. An example of an acrylic includes polymethyl methacrylate (PMMA), polyethyl methacrylate (PEMA), methacrylate (MA), or any blend or copolymer thereof, or any combination thereof. An example of a diene elastomer includes ethylene propylene diene monomer (EPDM) and ABS, SBR, and SBS may be examples of diene elastomers, as well. An example of a polyether includes polyetheretherketones (PEEK). An example of a polyester includes polyethylene terephthalate. An example of a halogenated polyolefin includes tetrafluorethylene-perfluorpropylene (FEP), polytetrafluoroethylene (PTFE), or any blend or copolymer thereof, or any combination thereof. An example of a polyolefin includes polyethylene, polypropylene, polybutene, ethylene octene copolymer, ethylene propylene copolymer, or any blend or copolymer thereof, or any combination thereof.

The polymer may be a crystalline polymer or an amorphous polymer. A amorphous polymer is a polymer where the polymer chains are arranged in a random disorganized state. A crystalline polymer is a polymer in which the polymer chains form crystalline (highly-ordered) regions. A crystalline polymer may also have amorphous regions. The degree of crystallinity of a polymer is the fractional amount of crystallinity in the polymer. A crystalline polymer may have a degree of crystallinity at least about 10%, and, in particular, at least about 25%, such as at least about 35% or at least about 50%.

In addition, the composite material may include an alumina particulate. In an exemplary embodiment, the alumina particulate may include a seeded alumina hydrate particulate. In general, the alumina hydrate particulate material includes hydrated alumina conforming to the formula: $Al(OH)_aO_b$, where $0<a\leq 3$ and $b=(3-a)/2$. In general, the alumina hydrate particulate material has a water content of about 1% to about 38% by weight, such as about 15% to about 38% water content by weight. In a particular embodiment, the alumina hydrate particulate material is free of non-alumina ceramic materials, and, in particular, is free of silica and aluminosilicate materials. By way of example, when a=0 the formula corresponds to alumina ($Al_2O_3$).

Alumina hydrate particulate materials can include aluminum hydroxides, such as ATH (aluminum tri-hydroxide), in mineral forms known commonly as gibbsite, bayerite, or bauxite, or can include alumina monohydrate, also referred to as boehmite. Such mineral form aluminum hydroxides can form alumina hydrate particulate material useful in forming the filler.

According to an embodiment, the alumina hydrate particles have a primary aspect ratio, defined as the ratio of the longest dimension to the next longest dimension perpendicular to the longest dimension. In an embodiment, the longest dimension and the second longest dimension may be substantially similar and the primary aspect ratio may be about 1:1. In an alternative embodiment, the longest dimension and the second longest dimension may be different and the primary aspect ratio may be generally at least about 2:1, and, in particular, at least about 3:1, such as at least about 4:1, or at least about 6:1. Particular embodiments have relatively elongated particles, having primary aspect ratios such as at least about 8:1, at least about 10:1, and, in particular examples, at least about 14:1.

With particular reference to the morphologies of the alumina hydrate particles, different morphologies are available, such as needle-shaped particles, platelet-shaped particles, and clusters of platelet-shaped particles. For example, particles having a needle-shaped morphology may be further characterized with reference to a secondary aspect ratio defined as the ratio of the second longest dimension to the third longest dimension perpendicular to the first and second longest dimensions. The secondary aspect ratio of a needle-shaped particle is generally not greater than about 3:1, typically not greater than about 2:1, or not greater than about 1.5:1, and oftentimes about 1:1. For a needle-shaped particle, the secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, the alumina hydrate particle can be a platy or platelet-shaped particle generally of an elongated structure having a primary aspect ratio described above in connection with the needle-shaped particles. However, a platelet-shaped particle generally has opposite major surfaces, the opposite major surfaces being generally planar and generally parallel to each other. In addition, the platelet-shaped particle may be characterized as having a secondary aspect ratio greater than that of needle-shaped particles, generally at least about 3:1, such as at least about 6:1, or at least about 10:1. Typically, the shortest dimension or edge dimension, perpendicular to the opposite major surfaces or faces, is generally less than 50 nanometers, such as less than about 40 nanometers, or less than about 30 nanometers.

According to another embodiment, a cluster of platelet-shaped particles can generally form an elongated structure having a primary aspect ratio described above in connection with the needle-shaped particles. In addition, the ellipsoidal-shaped cluster may be characterized as having a secondary aspect ratio not greater than about 2:1, not greater than about 1.5:1, or about 1:1.

In an exemplary embodiment, the alumina hydrate particulate has an average agglomerate size not greater than about 30 microns. Agglomerates are defined herein as an adhered set of alumina particles. For example, the alumina hydrate particulate may have an average agglomerate size not greater than about 25 microns, such as not greater than about 20 microns, or even not greater than about 15 microns.

Individual alumina hydrate particles may have an average longest particle dimension of not greater than about 2000 nm. For example, the average largest particle dimension may be not greater than about 1000 nm, such as not greater than about 500 nm. In particular, the average largest particle dimension may be in a range between about 50 nm to about 300 nm. Due to process constraints of certain embodiments, the smallest average particle size is generally at least about 50 nm, such as at least about 75 nm, such as at least about 100 nm, or at least about 135 nm. Additionally, individual alumina hydrate particles may have an average shortest particle dimension not greater than about 50 nm.

Due to the non-spherical morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether in dispersed or agglomerated forms. Of course, agglomerates have a comparatively larger average particle size.

In addition to aspect ratio and average particle size of the alumina hydrate particulate material, morphology of the particulate material may be further characterized in terms of specific surface area. Herein, the $C_{BET}$ value and the specific surface area of the particulate material relates to specific surface area as measurable by the commonly available BET technique. In an exemplary embodiment, the $C_{BET}$ value of the unmodified alumina hydrate particulate material is at least about 120, such as at least about 150. According to embodiments herein, the alumina hydrate particulate material has a specific surface area, generally at least about $10 \, m^2/g$, such as at least about $20 \, m^2/g$, at least about $30 \, m^2/g$, or at least about $40 \, m^2/g$, or at least about $70 \, m^2/g$. Since specific surface area is a function of particle morphology as well as particle size, generally the specific surface area of embodiments is not greater than about $250 \, m^2/g$, such as not greater than about $200 \, m^2/g$ or not greater than about $90 \, m^2/g$. In particular, the surface area may be about $50 \, m^2/g$ to $250 \, m^2/g$. In an exemplary embodiment, needle shaped alumina hydrate particulate has a specific surface area of about $100 \, m^2/g$ to about $250 \, m^2/g$. In another exemplary embodiment, platelet shaped alumina hydrate particulate has a specific surface area about $50 \, m^2/g$ to about $98 \, m^2/g$.

In the context of one aluminous seeded material example, processing begins with provision of a solid particulate boehmite precursor and boehmite seeds in a suspension, and heat treating (such as by hydrothermal treatment) the suspension (alternatively sol or slurry) to convert the boehmite precursor into boehmite particulate material formed of particles or crystallites. While certain embodiments make use of the as-formed hydrothermally-treated product for use as a filler, other embodiments utilize heat treatment to effect polymorphic transformation into alumina, particularly transitional alumina. According to one aspect, the particulate material (including boehmite and transitional alumina) has a relatively elongated morphology, as already described above. In addition, the morphological features associated with the boehmite are preserved in the transitional alumina particulate material.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas, such as ATH (aluminum trihydroxide), a common precursor material used herein for the fabrication of boehmite particulate materials.

Turning to the details of the processes by which the seeded aluminous particulate material may be manufactured, typically an aluminous material precursor including bauxitic minerals, such as gibbsite and bayerite, are subjected to hydrothermal treatment as generally described in the commonly owned patent, U.S. Pat. No. 4,797,139. More specifically, the particulate material may be formed by combining the precursor and seeds (having desired crystal phase and composition, such as boehmite seeds) in suspension, exposing the suspension (alternatively sol or slurry) to heat treatment to cause conversion of the raw material into the composition of the seeds (in this case boehmite). The seeds provide a template for crystal conversion and growth of the precursor. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns, preferably less than 100 nm, and even more preferably less than 10 nm. In the case the seeds are agglomerated, the seed particles size refers to seed primary particles size. Generally, the seed particles are present in an amount greater than about 1% by weight of the boehmite precursor, typically at least 2% by weight, such as 2 to 40% by weight, more typically 5 to 15% by weight (calculated as $Al_2O_3$). Precursor material is typically loaded at a percent solids content of 60% to 98%, preferably 85% to 95%. Heating is carried out at a temperature greater than about $120°$ C., such as greater than about $100°$ C., or even greater than about $120°$ C., such as greater than about $130°$ C. In one embodiment the processing temperature is greater than $150°$ C. Usually, the processing temperature is below about $300°$ C., such as less than about $250°$ C. Processing is generally carried out in the autoclave at an elevated pressure such as within a range of about $1 \times 10^5$ newtons/$m^2$ to about $8.5 \times 10^6$ newtons/$m^2$. In one example, the pressure is autogenously generated, typically around $2 \times 10^5$ newtons/$m^2$.

In the case of relatively impure precursor material, such as bauxite, generally the material is washed, such as rinsing with de-ionized water, to flush away impurities such as silicon and titanium hydroxides and other residual impurities remaining from the mining processes to source bauxite.

The particulate aluminous material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general. Time periods typically range from about 1 to 24 hours, preferably 1 to 3 hours.

Following heat treatment and crystalline conversion, the liquid content is generally removed, desirably through a process that limits agglomeration of the particles of boehmite upon elimination of water, such as freeze drying, spray drying, or other techniques to prevent excess agglomeration. In certain circumstances, ultrafiltration processing or heat treatment to remove the water might be used. Thereafter, the resulting mass may be crushed, such as to 100 mesh, if needed. It is noted that the particulate size described herein generally describes the single crystallites formed through processing, rather than any aggregates that may remain in certain embodiments.

Several variables may be modified during the processing of the particulate material to effect the desired morphology. These variables notably include the weight ratio, that is, the ratio of precursor (i.e., feed stock material) to seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at $180°$ C. for two hours in a 2 weight % nitric acid solution, a 90:10 ATH:

boehmite ratio (precursor:seed ratio) forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 180° C. for two hours with an ATH:boehmite seed ratio of 90:10 in a 2 weight % nitric acid solution, the synthesized particles are generally needle-shaped. In contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. When a mixture of acids and bases is utilized, such as 1 weight % KOH and 0.7 weight % nitric acid, the morphology of the synthesized particles is platelet-shaped. Noteworthy, the above weight % values of the acids and bases are based on the solids content only of the respective solid suspensions or slurries, that is, are not based on the total weight % of the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

As noted above, the as-formed hydrothermally processed particulate material may be used as the reinforcing filler in certain embodiments, while in other embodiments, processing may continue to form a converted form of filler. In this case, the hydrothermally processed particulate material forms the feedstock material that may be further heat treated. In the case of boehmite particulate material from hydrothermal processing, further thermal treatment causes conversion to transitional alumina. Here, the boehmite feedstock material is heat treated by calcination at a temperature sufficient to cause transformation into a transitional phase alumina, or a combination of transitional phases. Typically, calcination or heat treatment is carried out at a temperature greater than about 250° C., but lower than 1100° C. At temperatures less than 250° C., transformation into the lowest temperature form of transitional alumina, gamma alumina, typically will not take place. At temperatures greater than 1100° C., typically the precursor will transform into the alpha phase, which is to be avoided to obtain transitional alumina particulate material. According to certain embodiments, calcination is carried out at a temperature greater than 400° C., such as not less than about 450° C. The maximum calcination temperature may be less than 1050° C. or 1100° C., these upper temperatures usually resulting in a substantial proportion of theta phase alumina, the highest temperature form of transitional alumina.

Other embodiments are calcined at a temperature lower than 950° C., such as within a range of 750° C. to 950° C. to form a substantial content of delta alumina. According to particular embodiments, calcination is carried out at a temperature less than about 800° C., such as less than about 775° C. or 750° C. to effect transformation into a predominant gamma phase.

Calcination may be carried out in various environments including controlled gas and pressure environments. Because calcination is generally carried out to effect phase changes in the precursor material and not chemical reaction, and since the resulting material is predominantly an oxide, specialized gaseous and pressure environments need not be implemented except for most desired transitional alumina end products.

However, typically, calcination is carried out for a controlled time period to effect repeatable and reliable transformation from batch to batch. Here, most typically shock calcination is not carried out, as it is difficult to control temperature and hence control phase distribution. Accordingly, calcination times typically range from about 0.5 minutes to 60 minutes, typically, 1 minute to 15 minutes.

Generally, as a result of calcination, the particulate material is mainly (more than 50 wt %) transitional alumina. More typically, the transformed particulate material was found to contain at least 70 wt %, typically at least 80 wt %, such as at least 90 wt % transitional alumina. The exact makeup of transitional alumina phases may vary according to different embodiments, such as a blend of transitional phases, or essentially a single phase of a transitional alumina (e.g., at least 95 wt %, 98 wt %, or even up to 100 wt % of a single phase of a transitional alumina).

According to one particular feature, the morphology of the boehmite feedstock material is largely maintained in the final, as-formed transitional alumina. Accordingly, desirable morphological features may be engineered into the boehmite according to the foregoing teaching, and those features preserved. For example embodiments have been shown to retain at least the specific surface area of the feedstock material, and in some cases, increase surface area by amount of at least 8%, 10%, 12%, 14% or more.

In the context of seeded aluminous particulate material, particular significance is attributed to the seeded processing pathway, as not only does seeded processing to form seeded particulate material allow for tightly controlled morphology of the precursor (which is largely preserved in the final product), but also the seeded processing route is believed to manifest desirable physical properties in the final product, including compositional, morphological, and crystalline distinctions over particulate material formed by conventional, non-seeded processing pathways.

According to embodiments described herein, a relatively powerful and flexible process methodology may be employed to engineer desired morphologies into the final boehmite product. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies.

Figure 2:
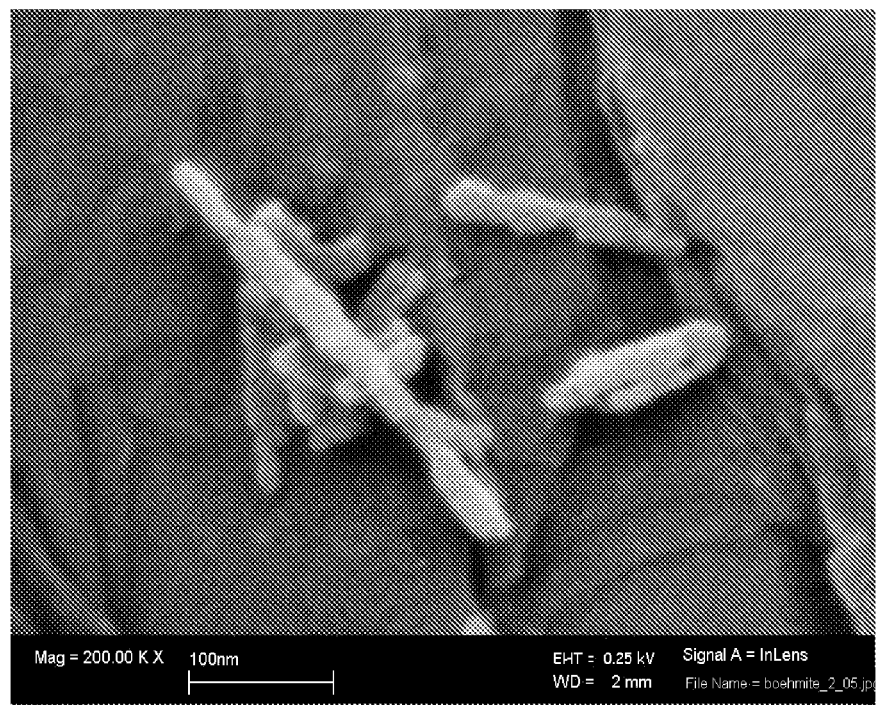
FIG. 2 is an illustrative image of exemplary needle shaped particles.
Figure 3:
FIG. 3 is an illustrative image of exemplary needle shaped particles having nodular structure.

Additional characterization studies were carried out to more precisely understand the effect of seeding on particle morphology. FIG. 1 illustrates the platelet shapes particles as discussed above. FIG. 2 illustrates needle shaped particles as discussed above. FIG. 2 reveals that the seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles as shown in FIG. 3. The particles have a controlled aggregate morphology, in that the aggregates display a level of uniformity beyond conventional aggregate technologies. It is understood that the controlled aggregate structures form the nodular structure, and are unique to the seeded approach discussed above.

Figure 4:
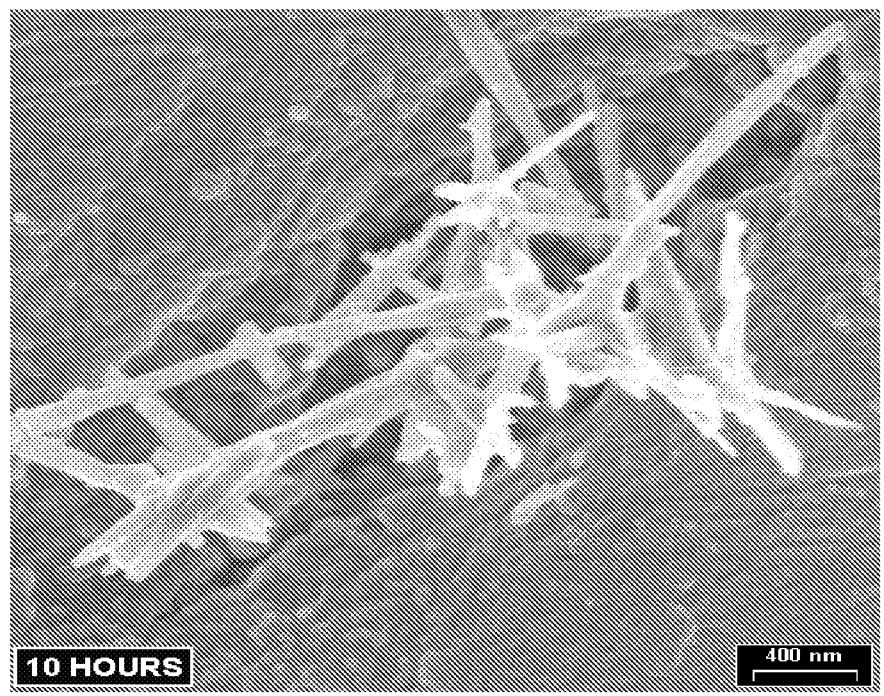
FIG. 4 is an illustrative image of prior art smooth hair-like particles.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates that are devoid of the seeded morphology, notably lacking the nodular structure. FIG. 4 is representative of such materials, showing non-seeded morphology that has a smooth or hair-like outer surface texture. Examples of such non-seeded approaches include those disclosed in U.S. Pat. Nos. 3,108,888 and 2,915, 475, and thesis paper Preparation and Characterization of Acicular Particles and Thin Films of Aluminum Oxide, by Raymond M. Brusasco, May 1987. The material shown in FIG. 4 was formed the process disclosed in JP2003-054941.

In a further embodiment, a composite may include the alumina particulate dispersed in a polymer. The alumina particulate can be dispersed in the polymer base by using conventional compounding techniques. In an exemplary method, a dried polymer may be mixed with a dried alumina particulate. For example, the polymer may be dried in a vacuum drier and the alumina particulate may be dried in a pan drier. Alternatively, the alumina particulate may be spray dried. The dried polymer-alumina particulate mixture can be extruded, with the extrudate being cooled and pelletized. For example, the mixture may be extruded using a twin screw extruder. The pelletized extrudate may be dried, such as by a vacuum drier. The dried, pelletized extrudate may be further extruded, such as by a single screw extruder, and formed, such as by forming into a film or injecting into a mold, to form a product. Alternatively, the alumina particulate may be introduced with polymer precursors prior to or during polymerization of the polymer.

In an exemplary embodiment, the particulate filler may be compounded with the polymer to form the composite material. For example, the composite material may include about 0.5 wt. % to about 50 wt. % of the particulate filler based on the total weight of the composite. In a further example, the composite material may include treated particulate filler in an amount between about 2 wt. % and about 30 wt. %, such as an amount between about 5 wt. % and about 20 wt. %.

In a particular example, the alumina particulate can be uniformly dispersed within polar polymers without forming aggregates. In another example, alumina particulates, combined with a coupling agent, can be uniformly dispersed within non-polar polymers without forming aggregates. The coupling agent may have at least one hydrocarbon group that can modify the interaction of the ceramic particulate with the non-polar polymer. For example, the hydrocarbon group may include a hydrocarbon chain group, such as an alkyl group or a cyclic hydrocarbon group, such a benzyl group. In a particular example, the hydrocarbon group may include a benzyl group. In another example, the hydrocarbon group can include a long-chain alkyl group, such as an alkyl group having at least about 9 carbons, for example, about 9 carbons to about 25 carbons. In addition, the coupling agent may include a polar functional group configured to interact with the ceramic particulate. For example, the polar group may include a titanate, a zirconate, a phosphinic acid group, a phosphate, a phosphonate, a phosphonic acid group, a sulphonic acid group, a sulfinic acid group, a carboxylic acid group, a silane, or an ester derivative thereof, or any combination thereof. In a particular example, the polar functional group includes a phosphonic acid group or an ester derivative thereof. For example, the polar functional group may include a phosphonic acid group. In another example, the polar functional group may include a mono-ester derivative of a phosphonic acid group.

In particular, coupling agent having a combination of a phosphonic acid group or an ester derivative thereof with one of a long chain alkyl group, a cyclic alkyl group, or a benzyl group provides improved properties to a polymer blend incorporating a filler modifier with such a coupling agent. In a particular example, a coupling agent including a phosphonic acid group and a benzyl group, such as phenyl-phosphonic acid (PPA), provides improved properties. In a further example, a coupling agent, such as octyl phosphonic acid (OPA) or octyl (2ethylhexyl) acid phosphate (OAP), may provide improved properties. In another exemplary embodiment, a coupling agent including an ester derivative of a phosphonic acid group and a long-chain alkyl group, such as monoester derivative of a long chain alkyl phosphonate, provides improved properties. For example, the long chain alkyl phosphonate may have at least 15 carbons, such as 15-20 carbons in the alkyl chain.

In an alternative embodiment, the polymer of the composite may be a curable polymer. A coupling agent for use with the curable polymer may include a polymer reactive functional group and a filler affinitive functional group. For example, the filler affinitive functional group may be a functional group, such as a titanate, a zirconate, a phosphinic acid group, a phosphate, a phosphonate, a phosphonic acid group, a sulphonic acid group, a sulfinic acid group, a carboxylic acid group, a silane, or an ester derivative thereof, or any combination thereof. In a further example, the polymer reactive functional group may include a polysulfide group, a mercapto group, an alkene group, or any combination thereof.

In a particular example, the composite material exhibits improved barrier properties to oxygen transfer. For example, the composite material may exhibit a reduced Oxygen Transfer Rate (OTR). OTR is the cubic centimeters of oxygen transferred through a square meter of a material in a day ($cc/m^2 \cdot day$) at standard temperature and pressure and 50% relative humidity. In an exemplary embodiment, the composite material has an OTR of not greater than 70 $cc/m^2 \cdot day$. In a further exemplary embodiment, the composite material may exhibit an OTR of not greater than about 60 $cc/m^2 \cdot day$, such as not greater than about 30 $cc/m^2 \cdot day$. As such, the composite material exhibits an improved Oxygen Transfer Index (OTI). Oxygen Transfer Index (OTI) is defined as 100 times the ratio of the Oxygen Transfer Rates (OTR) of the base polymer absent the alumina particulate to the composite material. For example, the OTI of the composite material may be at least about 150 relative to the polymer absent the alumina particulate. In particular, the OTI may be at least about 275, such as at least about 400.

In addition, the composite material may exhibit improved barrier properties to water vapor transfer. For example, the composite material may exhibit a reduced Water Vapor Transfer Rate (WVTR). WVTR is the cubic centimeters of water vapor transferred through a square meter of a material in a day ($cc/m^2 \cdot day$) at standard temperature and pressure and 50% relative humidity. In an exemplary embodiment, the composite material has a WVTR of not greater than 270 $cc/m^2 \cdot day$. In a further exemplary embodiment, the composite material may exhibit a WVTR of not greater than about 220 $cc/m^2 \cdot day$, such as not greater than about 170 $cc/m^2 \cdot day$. As such, the composite material exhibits an improved Water Vapor Transfer Index (WVTI). Water Vapor Transfer Index (WVTI) is defined as 100 times the ratio of the Water Vapor Transfer Rates (WVTR) of the base polymer to the composite material. For example, the WVTI of the composite material may be at least about 120 relative to the polymer absent the alumina particulate. In particular, the WVTI may be at least about 155, such as at least about 190.

In a particular example, the composite material includes a polyamide and an alumina particulate. The alumina particulate may have a longest particle dimension not greater than about 1000 nm and an secondary aspect ratio of at least about 3:1. In particular, the composite material may exhibit an Oxygen Transfer Index of at least about 150. Further, the alumina hydrate particulate may have a specific surface area of at least about 30 $m^2/g$.

Particular embodiments of the composite material advantageously exhibit improved barrier properties and thus, can be used in barrier applications where the base polymer may not be used. While aluminous materials have been included in composite materials, Applicants have discovered advantageous properties, such as enhanced oxygen and water barrier properties, that result from the use of particular composite formulations and processing techniques.

In a particular embodiment, the composite material may be used to form tires. For example, a tire may include a metal reinforcing layer surrounded by a composite elastomeric layer. The composite elastomeric layer may include a diene or styrene elastomer and an aluminous particulate having a secondary aspect ratio of at least about 3. In particular, the composite elastomeric layer may have desirable gas and water barrier properties. As a result, a traditional butyl liner barrier layer may be absent from the tire.

In a further example, a barrier film for use in construction may be formed of a thermoplastic composite material. For example, the thermoplastic composite may include a thermoplastic polymer and an aluminous particulate having a secondary aspect ratio of at least about 3. The thermoplastic polymer may be a polyolefin, a polyamide, a vinyl polymer, or any combination thereof. In particular, the barrier film may have desirable gas and water barrier properties.

In an additional embodiment, a hose may be formed of a thermoplastic composite material. For example, the hose may be used to transport liquids and gasses. In an example, the hose may transport carbon dioxide for use in carbonating drinks. In another example, the hose may transport oxygen or nitrogen. In a further example, the hose may be an airbrake hose. In particular, the composite material forming the hose may include a thermoplastic polymer, such as polyamide, polyester, polyolefin, halogenated polyolefin, or any combination thereof. In addition, the composite material includes an aluminous particulate having a secondary aspect ratio of at least about 3.

EXAMPLES

Example 1

Compounding

Nylon 6 (Ultramid B-35 available from BASF) is dried in a vacuum drier for 6 hours at 70° C. CAM9080, a platelet shaped alumina hydrate available from Saint-Gobain Ceramics and Plastics, Inc., is dried in a pan drier for 6 hours at 90° C. The dried Nylon 6 is mixed with the dried alumina hydrate such that the amount of alumina hydrate is one of 3 wt. %, 5 wt. % or 10 wt %. Comparative samples are prepared using the dried Nylon 6 alone or in combination with 10 wt % nanoclay (Bentone 1651 available from Elementis).

The dried mixture is extruded using a Werner & Pfleiderer ZSC-30 twin screw iiextruder at a speed of 180 rpm and a temperature between 190° C. and 225° C. The extrudate is cooled and pelletized.

The pelletized extrudates are dried in a vacuum drier for 6 hours at 70° C. The dried, pelletized extrudates are extruded to a film using a Brabender single screw extruder ¾" diameter, 30:1 L/D and film maker Barrel with a film slit opening of 16 mil. The temperature is between 190° C. and 225° C. and the screw speed is 100 rpm.

Example 2

Transfer Rate Testing

The Oxygen Transfer Rate is tested at room temperature with a Mocon OxTran 2/20 Gas Permeation Analyzers. The Water Vapor Transfer Rates is tested at room temperature with a W3/31 Gas Permeation Analyzers.

The following tables, Table 1 and Table 2, summarize the transfer rates. The following samples are tested:
N6: sample of pure Nylon 6;
3% AH: sample of Nylon 6 compounded with 3 wt. % alumina hydrate;
5% AH: sample of Nylon 6 compounded with 5 wt. % alumina hydrate;
10% AH: sample of Nylon 6 compounded with 10 wt. % alumina hydrate;
10% NC: sample of Nylon 6 compounded with 10 wt. % nanoclay.

TABLE 1

| | Water Vapor Transfer | |
|---|---|---|
| Particulate Filler | Water Vapor Transfer Rate (cc/m2 · day) | Water Vapor Transfer Index |
| N6 | 333 | NA |
| 3% AH | 270 | 123 |
| 5% AH | 260 | 128 |
| 10% AH | 157 | 210 |
| 10% NC | 185 | 180 |

Table 1 illustrates the Water Vapor Transfer Rate (WVTR) and the Water Vapor Transfer Index (WVTI) for Nylon 6 compounded with platelet shaped alumina hydrate particulate. The 3% AH sample and the 5% AH sample exhibit similar WVTR, although the WVTR is higher than the WVTR of the 10% NC comparative sample. The 10% AH sample exhibits a lower WVTR than the 10% NC comparative sample.

TABLE 2

Oxygen Transfer

| Particulate Filler | Oxygen Transfer Rate (cc/m2 · day) | Oxygen Transfer Index |
|---|---|---|
| N6 | 93 | NA |
| 3% AH | 62 | 150 |
| 5% AH | 60 | 155 |
| 10% AH | 23 | 404 |
| 10% NC | 79 | 117 |

Table 2 illustrates the Oxygen Transfer Rate (OTR) and the Oxygen Transfer Index (OTI) for Nylon 6 compounded with platelet shaped alumina hydrate particulate. The 3% AH sample and the 5% AH sample exhibit similar OTR, lower than the OTR of the 10% NC comparative sample. The 10% AH sample exhibits a substantially lower OTR than all the other samples.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A polymer composition having enhanced barrier properties comprising
    a polymer base and alumina particulates dispersed within the polymer base, wherein the polymer base is selected from the group consisting of polyamide 6, polyamide 6,6, polyamide 11, polyamide 12, and mixtures thereof, and wherein the alumina particulates have a secondary aspect ratio of at least about 3:1;
    at least 50wt% of the alumina particulates is transitional alumina; the alumina particulates have been obtained by a seeding processing route and have a BET specific surface area of about 30 m²/g to about 250 m²/g; and
    the polymer composition is in form of a film having an Oxygen Transfer Index of at least about 150.

2. The polymer composition of claim 1, wherein an amount of the alumina particulates is between about 0.5 wt% and about 50 wt%.

3. The polymer composition of claim 2, wherein an amount of the alumina particulates is between about 3 wt% and about 10 wt%.

4. The polymer composition of claim 1, wherein the alumina particulates have a BET specific surface area of about 100 m²/g to about 250 m²/g.

5. The polymer composition of claim 1, wherein the alumina particulates have a BET specific surface area of about 50 m²/g to about 98 m²/g.

6. The polymer composition of claim 1, wherein the Oxygen Transfer Index is at least about 275.

7. The polymer composition of claim 6, wherein the Oxygen Transfer Index is at least about 400.

8. The polymer composition of claim 1, wherein the film has an Oxygen Transfer Rate of not greater than about 70 cc/m²·day.

9. The polymer composition of claim 1, wherein the alumina particulates have a longest dimension of at least about 50 nm.

10. The polymer composition of claim 9, wherein the longest dimension is at least about 100 nm.

11. The polymer composition of claim 1, wherein the alumina particulates have an average agglomerate size not greater than about 30 microns.

12. The polymer composition of claim 1, wherein the alumina particulates have a primary aspect ratio of at least about 3:1.

13. The polymer composition of claim 1, wherein the film has a Water Vapor Transfer Index of at least about 120.

14. The polymer composition of claim 13, wherein the film has a Water Vapor Transfer Index of at least about 155.

15. The polymer composition of claim 1, wherein the film has a Water Vapor Transfer Rate of not greater than about 270 cc/m²·day.

16. A method of producing a polymer product having enhanced barrier properties comprising:
    mixing a dried polymer with an amount of dried alumina particulates to form a mixture;
    extruding the mixture to form an extrudate; and forming the polymer product from the extrudate, wherein forming the polymer product includes extruding a film to form the polymer product; wherein
        the alumina particulates have a secondary aspect ratio of at least about 3:1; at least 50wt% of the alumina particulates are transitional alumina;
        the alumina particulates have been obtained by a seeding processing route and have a BET specific surface area of about 30 m²/g to about 250 m²/g;
        the polymer base is selected from the group consisting of polyamide 6, polyamide 6,6, polyamide 11, polyamide 12, and mixtures thereof;
        the polymer composition is in form of a film having an Oxygen Transfer Index of at least about 150 and a Water Vapor Transfer Index of at least about120.

17. The method of claim 16, wherein the film has an Oxygen Transfer Index of at least about 150.

18. The method of claim 16, wherein the alumina particulates have an average agglomerate size not greater than about 30 microns.

* * * * *